(12) United States Patent
Helzner

(10) Patent No.: US 7,185,930 B2
(45) Date of Patent: Mar. 6, 2007

(54) BRUSH GUARD WITH ADJUSTABLE REAR-VIEW MIRRORS

(76) Inventor: Michael D. Helzner, 10216 Bustleton Ave., Philadelphia, PA (US) 19116

( * ) Notice: Subject to any disclaimer, the term of this patent is extended or adjusted under 35 U.S.C. 154(b) by 140 days.

(21) Appl. No.: 11/108,788

(22) Filed: Apr. 19, 2005

(65) Prior Publication Data

US 2006/0012898 A1    Jan. 19, 2006

Related U.S. Application Data

(60) Provisional application No. 60/587,935, filed on Jul. 15, 2004.

(51) Int. Cl.
*B60R 19/52* (2006.01)
(52) U.S. Cl. .............. 293/115; 293/144; 180/68.6; 359/841
(58) Field of Classification Search ............. 293/115, 293/143, 144; 180/68.6; 359/841, 844
See application file for complete search history.

(56) References Cited

U.S. PATENT DOCUMENTS

| | | | |
|---|---|---|---|
| 1,964,873 A | 7/1934 | Dujardin | |
| 2,607,273 A | 8/1952 | Lark | |
| 3,059,790 A | 10/1962 | Augustus | |
| 3,420,490 A | 1/1969 | Malachowski | |
| 3,820,877 A | 6/1974 | Moyer | |
| 4,168,855 A * | 9/1979 | Koch | ......... 293/115 |
| 4,286,840 A | 9/1981 | Covert | |
| 4,758,078 A | 7/1988 | Bracamonte | |
| 4,907,871 A | 3/1990 | Hou | |
| 4,911,545 A | 3/1990 | Miller | |
| 4,921,337 A | 5/1990 | Hou et al. | |
| 5,572,376 A | 11/1996 | Pace | |
| 6,152,504 A * | 11/2000 | Dickson et al. | ............. 293/144 |
| 6,213,609 B1 | 4/2001 | Foote et al. | |
| 6,239,928 B1 | 5/2001 | Whitehead et al. | |

* cited by examiner

*Primary Examiner*—Joseph D. Pape
(74) *Attorney, Agent, or Firm*—Richard C. Litman

(57) ABSTRACT

The brush-guard with adjustable rear-view mirrors is an accessory vehicle brush-guard having at least one rear-view mirror telescopically mounted in one of the guard's vertical tubular members, or through parallel horizontal members. The rear-view mirror is disposed on the top of a stem that is vertically telescopically extendable from the brush guard. In a preferred embodiment, the brush-guard with adjustable rear-view mirrors includes a pair of rear-view mirrors, each of the mirrors being disposed at opposite, distal ends of the brush guard. The rear-view mirrors may be either manually or electrically adjustable in height. Each of the rear-view mirrors may include a back shell having an illuminated design or logo.

15 Claims, 7 Drawing Sheets

BRUSH GUARD WITH ADJUSTABLE REAR-VIEW MIRRORS

CROSS-REFERENCE TO RELATED APPLICATION

This application claims the benefit of U.S. Provisional Patent Application Ser. No. 60/587,935, filed Jul. 15, 2004.

BACKGROUND OF THE INVENTION

1. Field of the Invention

The present invention relates to vehicle rear-view mirrors. More specifically, the invention is a brush-guard with adjustable rear-view mirrors.

2. Description of the Related Art

Sport utility vehicles, along with pick-up trucks and small trucks generally, have experienced a dramatic rise in popularity and use in recent years. Along with the increased use of such vehicles in general, there has been a trend towards increased size of such vehicles in comparison with other automobiles.

As vehicles increase in size, the task of providing the driver with adequate vision surrounding the vehicle becomes more difficult. Side and rear-view mirrors are used to give the driver a view alongside and behind the vehicle. However, as vehicle size increases, more space tends to be blocked from the field of view of the mirrors. Additionally, sport utility and similar vehicles are often used to pull any of a variety of trailers, adding further obstructions to the driver's field of view.

Typically, side-mounted rear view mirrors are simply made larger, or extended from the side of the vehicle, or both, to improve the field of view provided by the mirror. While increasing the size of the mirror increases it's field of view, and extending the mirror laterally from the side of the vehicle helps to extend a line-of-sight beyond the vehicle itself or a trailer in tow, these solutions are imperfect and tend to create additional problems.

As side-mounted mirrors reach further from the sides of a vehicle, either due to the increased size of the mirror or its increased lateral extension, the risk increases that the mirror will be damaged by contact with a variety of obstructions or other vehicles. Such mirrors are particularly vulnerable to damage in parking lots, in drive-through situations, in car washes, and such situations where the vehicle is brought into close proximity to fixed obstructions, pedestrians, and other vehicles.

A further disadvantage of side-mounted rear-view mirrors, which are typically located adjacent to the driver and passenger side windows, is that a passenger-side mirror may be obstructed from the driver's view by a passenger, or by packages or other articles placed in a passenger seat. Such an obstruction may block the driver's view of the mirror entirely, or require that the driver lean forward or otherwise reposition in order to use the mirror.

It is therefore desirable to provide an alternative to conventional side-mounted rear-view mirrors for larger vehicles. A preferred location for rear-view mirrors is at the front of the vehicle, a brush-guard or similar accessory providing an ideal mounting location.

U.S. Pat. No. 1,964,873, issued Jul. 3, 1934 to H. Dujardin, describes a bracket mounted to the right front fender of a vehicle in the same plane as the outer edge of the fender that may have a mirror attached to the bracket by a ball and socket joint, the bracket serving as a guide to determine the outer edge of the right front fender.

U.S. Pat. No. 2,607,273, issued Aug. 19, 1952 to S. D. Lark, discloses a mirror vertically extensible from a compartment defined in a center-mounted hood ornament. The mirror is mounted on a rod slidable in a tube, the mirror being spring-biased for concealment in the chamber. A pulley and cable mechanism manually operated by the driver of the vehicle can be used to raise the mirror, which includes a pin and slot arrangement for tilting the mirror to view the left rear or right rear of the vehicle.

U.S. Pat. No. 4,758,078, issued Jul. 19, 1988 to R. V. Bracamonte, teaches a rear view mirror mounted on a telescoping mast. The mast is located directly in front of the windshield. A motor is also included for rotating the mirror about a vertical axis. U.S. Pat. No. 3,420,490 issued Jan. 7, 1969, shows a mirror mounted on a V-shaped bracket, an arm supporting the mirror being pivotally attached to the vertex of the V-shaped bracket so that the mirror is pivotal between a vertical and horizontal position.

Several rear view mirror mounts provide for lateral extension of the mirror, including devices described in U.S. Pat. No.3,059,790, issued Oct. 23, 1962 to R. W. Augustus (mirror for vehicles with a bucket extended and retracted by pulley and cable); U.S. Pat. No. 3,820,877, issued Jun. 28, 1974 to J. E. Moyer (side mirror mounted to piston of hydraulic cylinder horizontally mounted in fender); U.S. Pat. No. 4,286,840, issued Sep. 1, 1983 to S. R. Covert (mirror mounted to horizontal arm attached to vertically oriented driveshaft driven by motor); U.S. Pat. Nos. 4,907,871 and 4,921,337issued Mar. 13, 1990 and May 1, 1990, respectively, to Hou et al. (first mirror extensible from chamber defined in housing of second mirror); U.S. Pat. No. 4,911,545, issued Mar. 27, 1990 to G. A. Miller (mirror mounted to piston of pneumatic or hydraulic cylinder in compartment in vehicle door or fender); U.S. Pat. No. 5,572,376, issued Nov. 5, 1996 to D. R. Pace (mirror housing mounted on a rack and operated by motor driven gearing); U.S. Pat. No. 6,213,609, issued Apr. 10, 2001 to Foote et al. (mirror extensible laterally either manually or by motor-driven screw); and U.S. Pat. No. 6,239,928, issued May 29, 2001 to Whitehead et al. (motor extensible laterally either manually or by motor-driven gears).

None of the above inventions and patents, taken either singly or in combination, is seen to describe the instant invention as claimed. Thus a brush-guard with adjustable rear-view mirrors solving the aforementioned problems is desired.

SUMMARY OF THE INVENTION

The brush-guard with adjustable rear-view mirrors comprises an accessory brush-guard having at least one adjustable rear-view mirror.

Brush guards, also known as grille guards, are a common accessory on sport utility vehicles and small trucks. Brush guards are typically an assembly of tubular members mounted to a vehicle's frame and arranged to protect the vehicle's grille. Apart from arms or the like arranged for mounting the guard to the vehicle frame, brush guards typically include a generally rectangular arrangement of tubular members having a plurality of horizontal and vertical members arranged to roughly match the shape of the vehicle grille or front end.

The brush-guard with adjustable rear-view mirrors comprises an accessory brush-guard having at least one rear-view mirror telescopically mounted in one of the guard's vertical tubular members. The rear-view mirror is disposed on the top of a stem that is vertically telescopically extendable from the brush guard.

In a preferred embodiment, the brush-guard with adjustable rear-view mirrors includes a pair of rear-view mirrors, each of the mirrors being disposed at opposite, distal ends of the brush guard. The rear-view mirrors may be either manually or electrically adjustable in height.

These and other aspects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
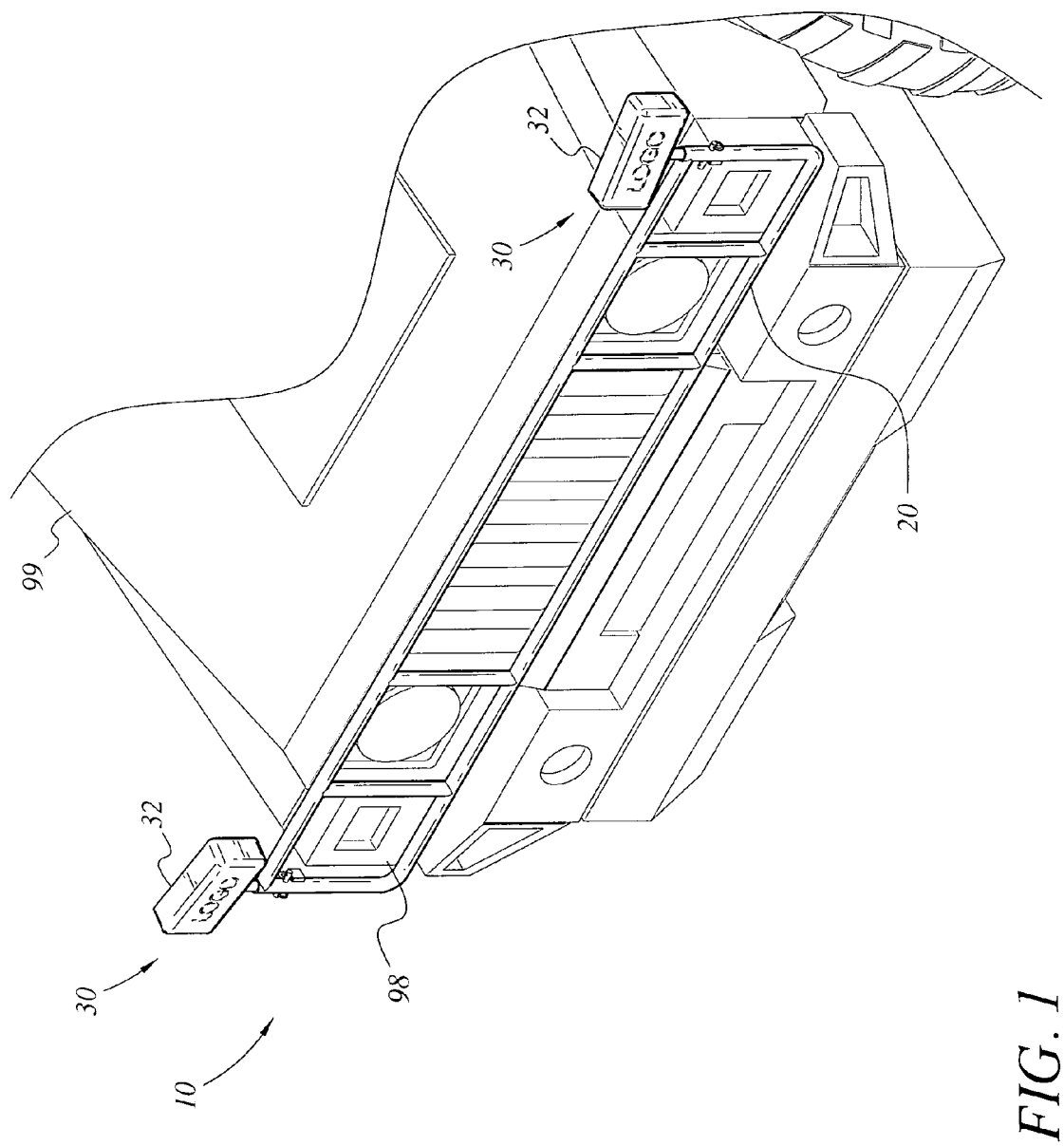
FIG. 1 is an environmental, perspective view of a brush-guard with adjustable rear-view mirrors according to the present invention mounted in front of the grille of a motor vehicle.
Figure 2:
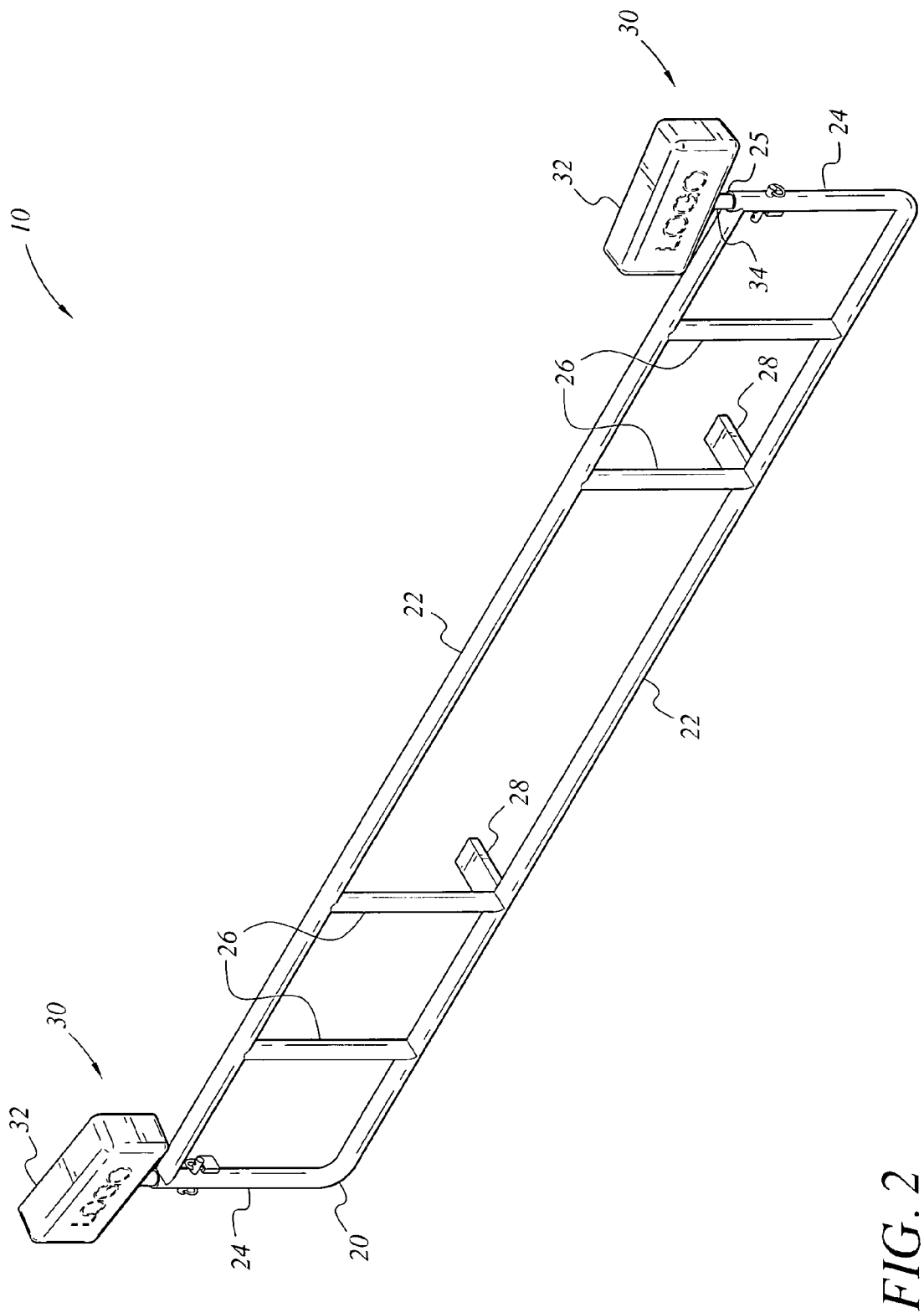
FIG. 2 is an environmental, perspective view of a brush-guard with adjustable rear-view mirrors according to the present invention.

The present invention is a brush-guard with adjustable rear-view mirrors, designated generally as 10 in the drawings. Referring to FIGS. 1 and 2, the brush-guard with adjustable rear-view mirrors 10 comprises a motor vehicle brush-guard assembly 20 of a conventional configuration, having a plurality of horizontal tubular members 22 and a plurality of vertical tubular members 24 and 26 arranged together in a generally rectangular configuration adapted to cover or protect portions of the front end or grille 98 of a motor vehicle 99. In the illustrated embodiment, the brush guard assembly 20 consists of two (2) horizontal members 22 joined at opposite ends by distal vertical members 24 to form a rectangle. One or more intermediate vertical members 26 are, optionally, disposed between the horizontal members 22 at various intervals between the distal vertical members 24. Mounting brackets 28 are attached to the brush guard assembly 20 to mount the brush guard assembly 20 securely to the motor vehicle 99. It can be recognized that mounting brackets 28 will vary widely in their location, dimensions, and configuration for compatibility with a wide range of differing motor vehicles.

Figure 3A:
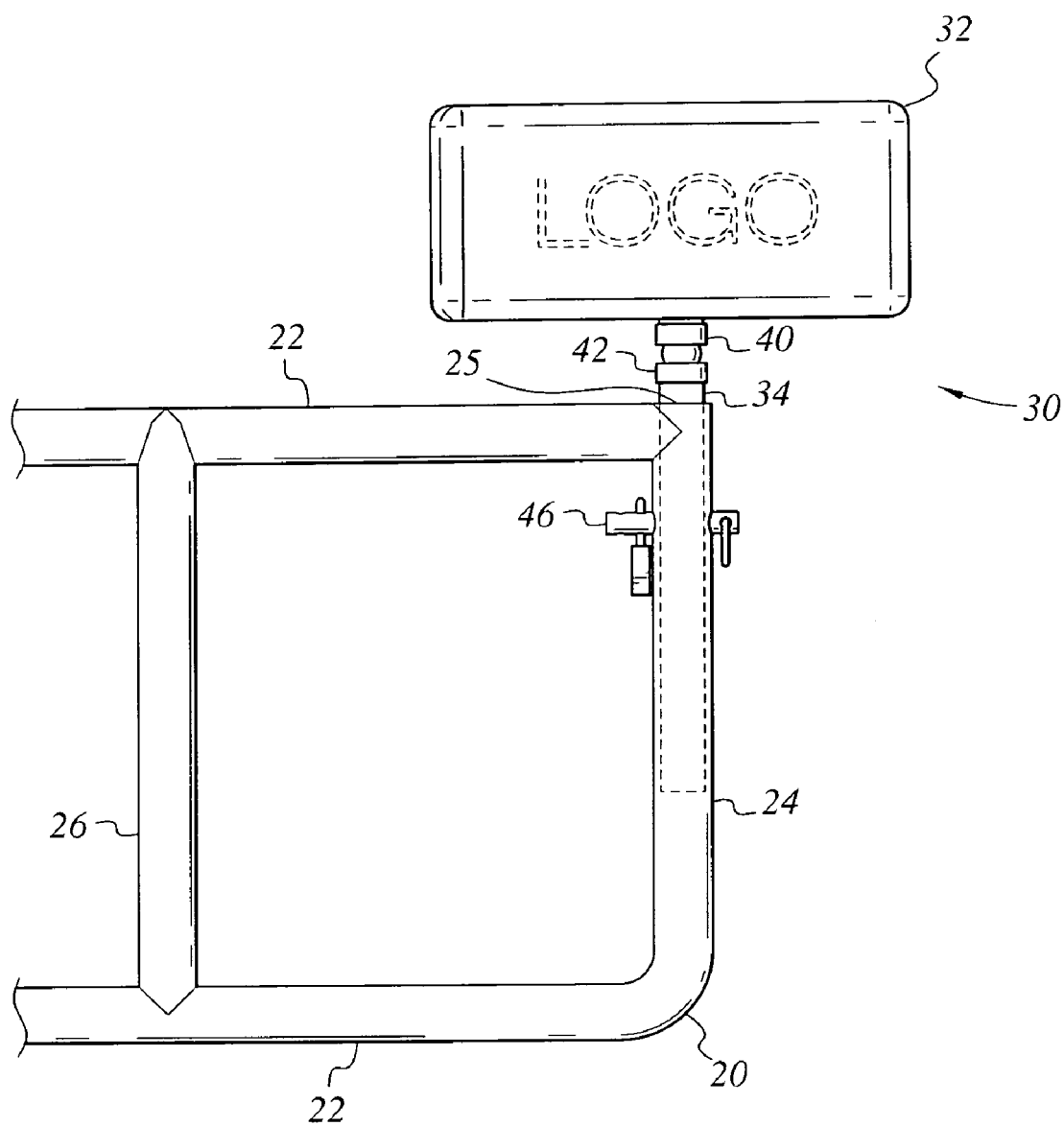
FIG. 3A is a fragmented elevational view of a brush-guard with adjustable rear-view mirrors according to the present invention showing a manually adjustable rear-view mirror telescopically mounted within a vertical tubular member of a brush guard.
Figure 3B:
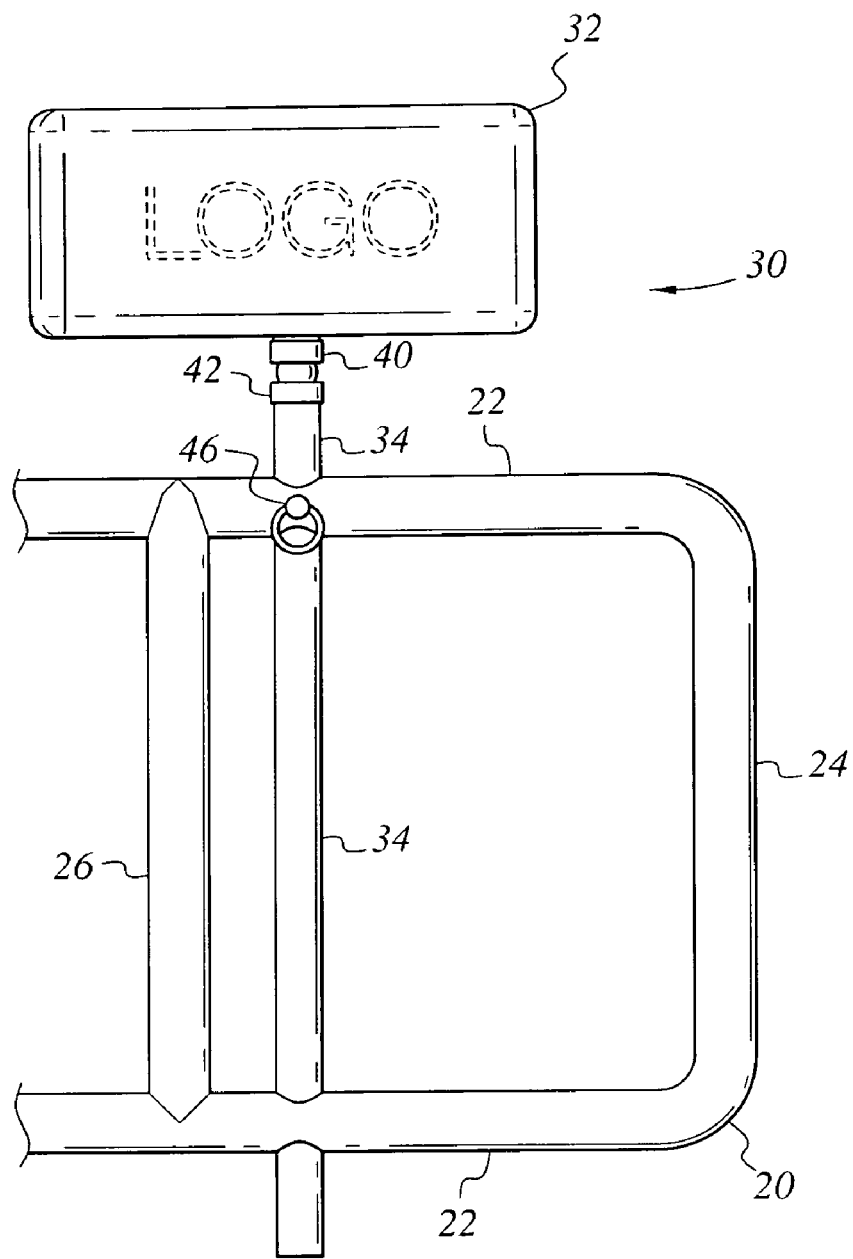
FIG. 3B is a fragmented elevational view of a brush-guard with adjustable rear-view mirrors according to the present invention showing an alternate mounting for a manually adjustable rear-view mirror.

At least one rear-view mirror assembly 30 is disposed on the brush guard assembly 20. In the instant embodiment, a pair of rear-view mirrors assemblies 30 are located at opposite distal ends of the brush guard assembly 20. Each of the rear-view mirror assemblies 30 is adjustable in height. A manually adjustable rear-view mirror assembly 30 comprises a rear-view mirror 32 disposed on the top end of a stem 34. Referring to FIG. 3A, distal vertical tubular members 24 have an open top end (TBD) whereby a rear-view mirror assembly 30 is mounted to the brush guard assembly 20 with its stem 34 inserted into, and telescopically extendible from, the open top end (TBD) of a distal vertical tubular member 24. Referring to FIG. 3B, a rear-view mirror assembly 30 is shown alternatively mounted to the brush guard assembly 20, the stem 34 extending through aligned apertures formed in each of the horizontal tubular members 22 of the brush guard assembly 20.

Figure 4:
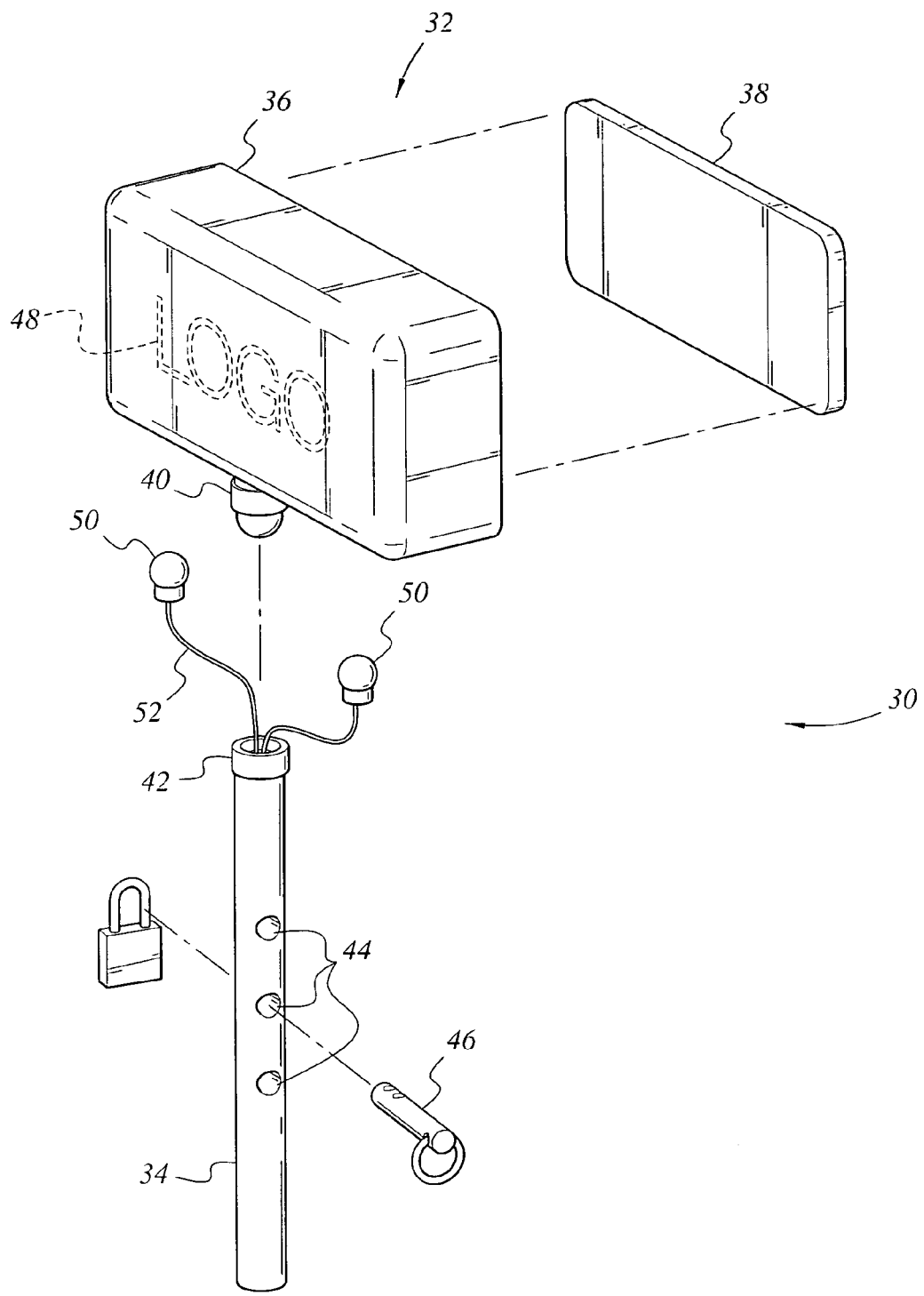
FIG. 4 is an exploded view of a manually adjustable rear-view mirror for a brush-guard with adjustable rear-view mirrors according to the present invention.

Turning now to FIG. 4, a rear-view mirror assembly 30 is shown in greater detail. A rear-view mirror 32, comprising a back shell 36 and a mirror 38 or reflective surface, is disposed on the top end of a stem 34, and preferably is engaged to the stem 34 by an articulable joint such as a ball 40 and socket 42 joint or other flexible attachment so that the rear-view mirror 32 is pivotally adjustable atop the stem 34. A plurality of apertures 44 are defined along the length of the stem 34 so that the stem 34 may be secured to the brush guard assembly 20 at various heights by a retaining pin 46, which may be locked by a padlock.

The back shell 36 may have a logo 48 or other design visibly formed thereon or therein. Logo 48 may be formed in a back shell 36 made of an opaque material by a forming a plurality of openings through the back shell 36, such as holes or slots, the openings being arranged to define the logo 48 or design. Alternatively, the back shell 36 may be made in whole or in part of a transparent or semi-transparent material with a logo printed thereon. One or more lamps 50 are disposed within the back shell 36 so that the logo may be illuminated. A lamp wiring harness 52 is provided for connection to the vehicle's electrical system.

Figure 5:
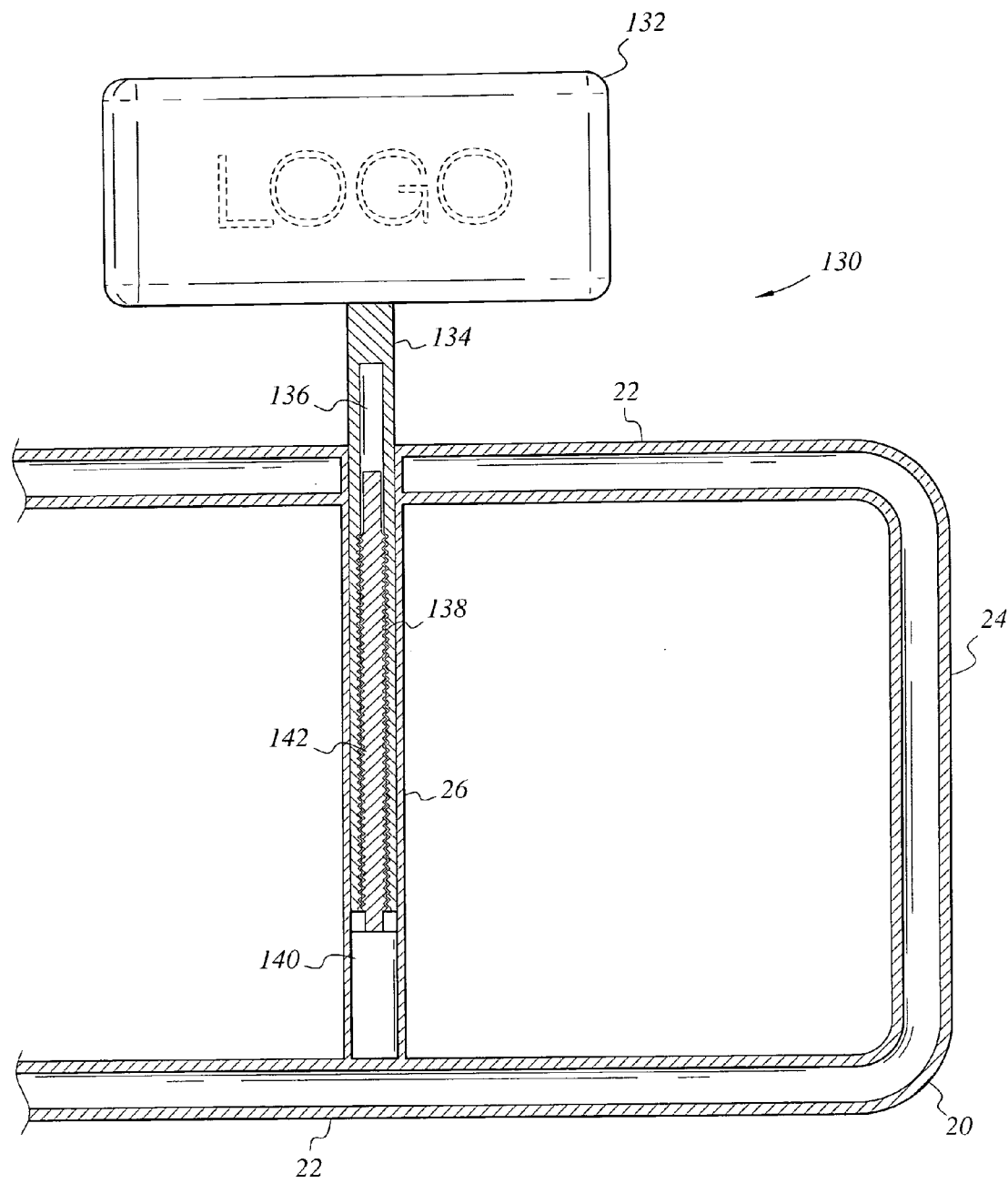
FIG. 5 is a fragmented cross-section view of a brush-guard with adjustable rear-view mirrors having electrically adjustable rear-view mirrors.

Turning now to FIG. 5, an electrically telescoping rear-view mirror assembly 130 is shown. In the illustrated embodiment, the rear-view mirror assembly 130 is shown disposed in one of the intermediate vertical members 26 of the brush guard assembly 20, although the distal vertical tubing members 24 are a generally preferred location for placement for the rear-view mirror assemblies 130. An electric motor 140 is disposed in intermediate vertical tubular member 26. An elongated, threaded shaft 142 is connected to and driven by the motor 140, and extends upward through at least a portion of the intermediate vertical tubular member 26. Stem 134 has a hollow interior 136, having a threaded bore 138 defined therein. The stem 134 is engaged with the threaded shaft 142, whereby rotation of the motor 140 in a first direction causes the stem 134 to extend from the intermediate vertical tubular member 26, while rotation of the motor 140 in an opposite direction causes the stem 134 to retract into the intermediate vertical tubular member 26. It can be appreciated that, as an alternative to the stem 134 having a threaded bore 138, one or more threaded inserts or bushings may be disposed within the hollow interior 136 of the stem 134. Rear-view mirror 132 is disposed on top of the stem 134.

Figure 6:
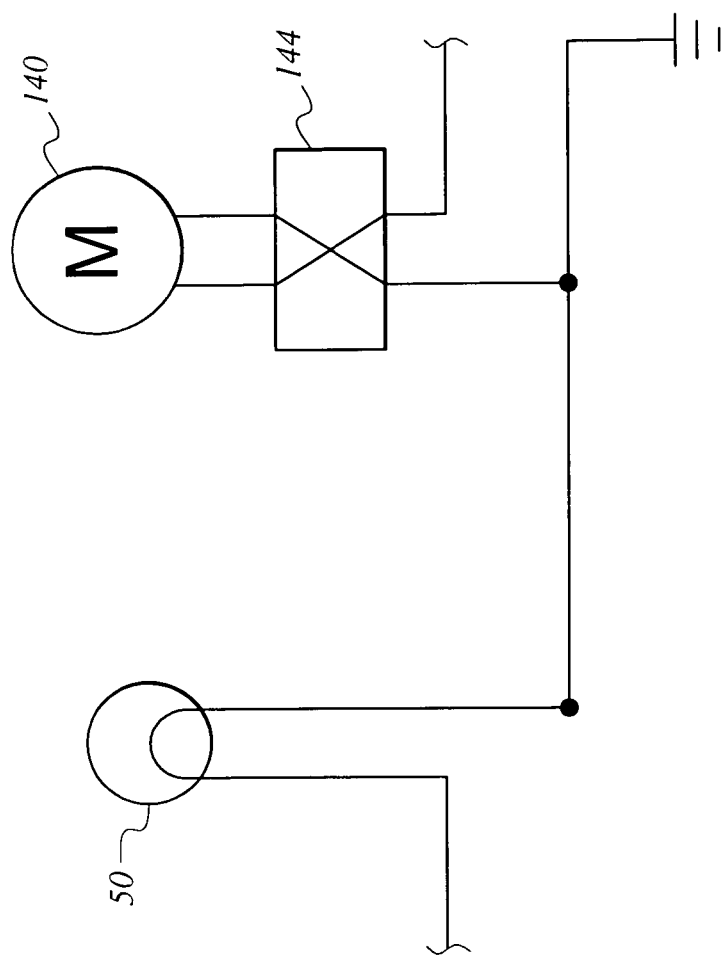
FIG. 6 is an electrical schematic for an electrically adjustable rear-view mirror as shown in FIG. 4.

Turning now to FIG. 6, a wiring schematic is shown for an electrically telescoping rear-view mirror assembly 130. A wiring harness provides a common, or ground, connection for both the electric motor 140 and the lamp 50 or lamps. Lamp 50 or lamps are typically connected to the vehicle's lighting system to be operated along with headlights or running lights. A three-position reversing switch 144 is connected to the motor 140, allowing the motor 140 to be operated in forward and reverse directions or deactivated.

It is to be understood that the present invention is not limited to the embodiments described above, but encompasses any and all embodiments within the scope of the following claims.

I claim:

1. A brush-guard with adjustable rear-view mirrors, comprising:
   a brush guard assembly having a plurality of horizontal tubular members and a plurality of vertical tubular members joined together in a generally rectangular configuration; and
   at least one rear-view mirror assembly having a stem with top and bottom ends, and a rear-view mirror coupled to the top end of said stem, the stem being telescopically inserted in the brush guard assembly along a vertical axis.

2. The brush-guard with adjustable rear-view mirrors according to claim 1, wherein at least one of said vertical tubular members is a receptacle comprising a vertical tubular member having an open top end, the receptacle telescopically receiving the stem of one of said rear-view mirror assemblies.

3. The brush-guard with adjustable rear-view mirrors according to claim 2, further comprising means for adjusting the height of said rear-view mirror assemblies.

4. The brush-guard with adjustable rear-view mirrors according to claim 1, wherein said plurality of said vertical tubular members comprises a pair of distal vertical tubular members defining opposite distal ends of said brush guard assembly.

5. The brush-guard according to claim 4, wherein at least one of said distal vertical tubular members is a receptacle comprising a vertical tubular member having an open top end, the receptacle telescopically receiving the stem of one of said rear-view mirror assemblies.

6. The brush-guard with adjustable rear-view mirrors according to claim 5, further comprising means for adjusting the height of said rear-view mirror assemblies.

7. The brush-guard with adjustable rear-view mirrors according to claim 1, further comprising an articulable joint coupling said rear view mirror to said stem.

8. The brush-guard with adjustable rear-view mirrors according to claim 1, wherein said rear view mirror comprises:
   a back shell having a back surface, and interior space, and a front; and
   a mirror retained in said back shell.

9. The brush-guard with adjustable rear-view mirrors according to claim 8, further comprising a lamp contained within said interior space.

10. A brush-guard with adjustable rear-view mirrors, comprising:
    a brush guard assembly having a lower and an upper horizontal tubular member and a plurality of vertical tubular members joined together in a generally rectangular configuration; and
    at least one rear-view mirror assembly comprising a receptacle tube vertically disposed between said lower and upper horizontal tubular members, a stem having a bottom end telescopically inserted into the receptacle tube and a top end, and a rear view mirror coupled to the top end of the stem.

11. The brush-guard with adjustable rear-view mirrors according to claim 10, wherein said rear-view mirror assembly further comprises:
    an electric motor disposed within said receptacle tube;
    a threaded shaft coupled to said electric motor; and
    a threaded member disposed on said stem and threadably engaged with said threaded shaft;
    whereby rotation of said threaded shaft by said electric motor causes movement of said threaded member along said threaded shaft.

12. The brush-guard with adjustable rear-view mirrors according to claim 10, further comprising means for fixing the vertical position of said stem within said receptacle tube.

13. The brush-guard with adjustable rear-view mirrors according to claim 10, further comprising an articulable joint coupling said rear view mirror to said stem.

14. The brush-guard with adjustable rear-view mirrors according to claim 10, wherein said rear view mirror comprises:
    a back shell having a back surface, and interior space, and a front; and
    a mirror retained in said back shell.

15. The brush-guard with adjustable rear-view mirrors according to claim 14, further comprising a lamp contained within said interior space.

* * * * *